Oct. 27, 1936.  F. L. KLEIN  2,058,595
GRAVITY SAFETY VALVE FOR HYDRAULIC BRAKE SYSTEMS
Filed Aug. 8, 1936   2 Sheets-Sheet 1
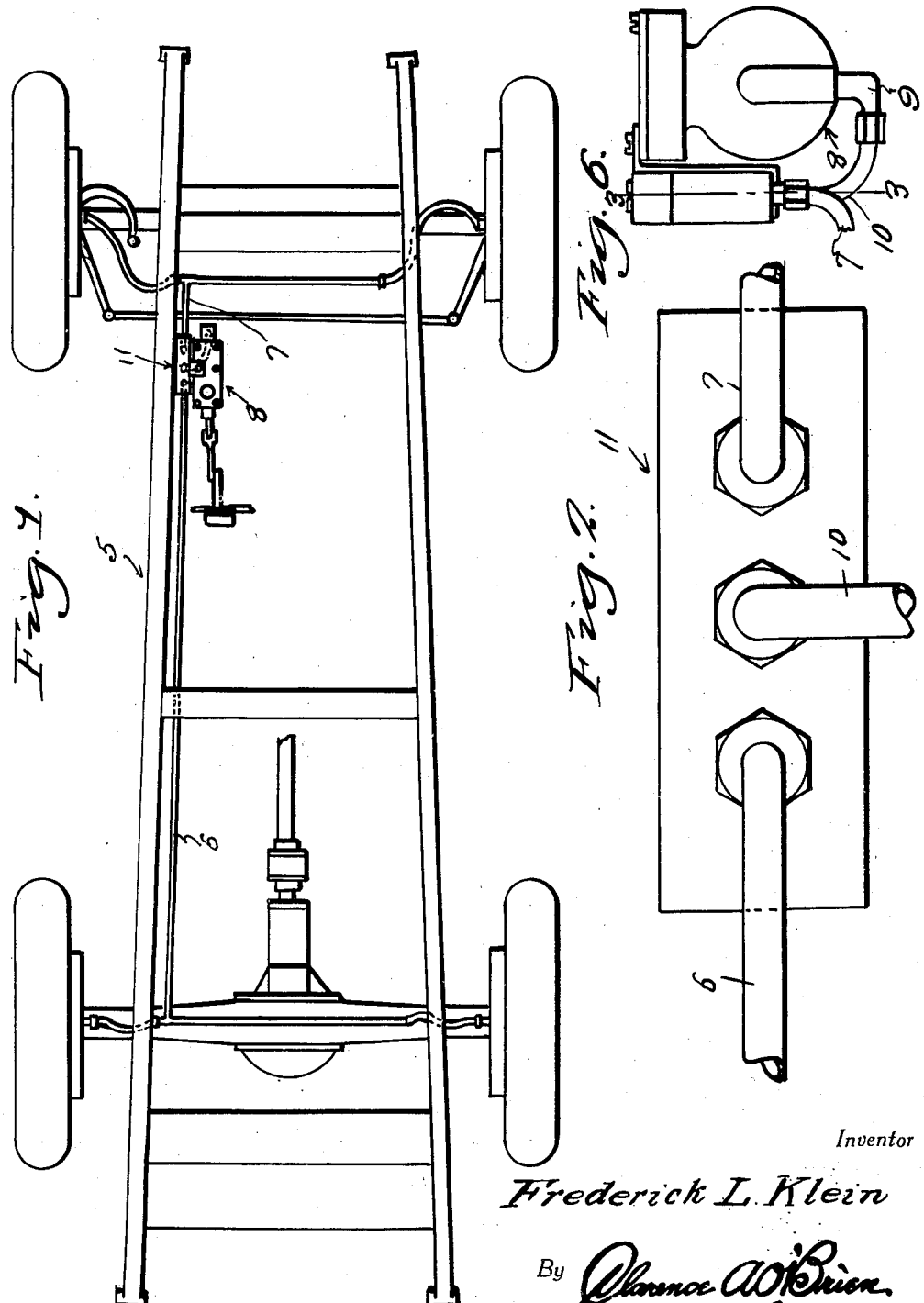
Inventor
*Frederick L. Klein*
By *Clarence A. O'Brien*
*Hyman Berman*
Attorneys Oct. 27, 1936.  F. L. KLEIN  2,058,595
GRAVITY SAFETY VALVE FOR HYDRAULIC BRAKE SYSTEMS
Filed Aug. 8, 1936  2 Sheets-Sheet 2
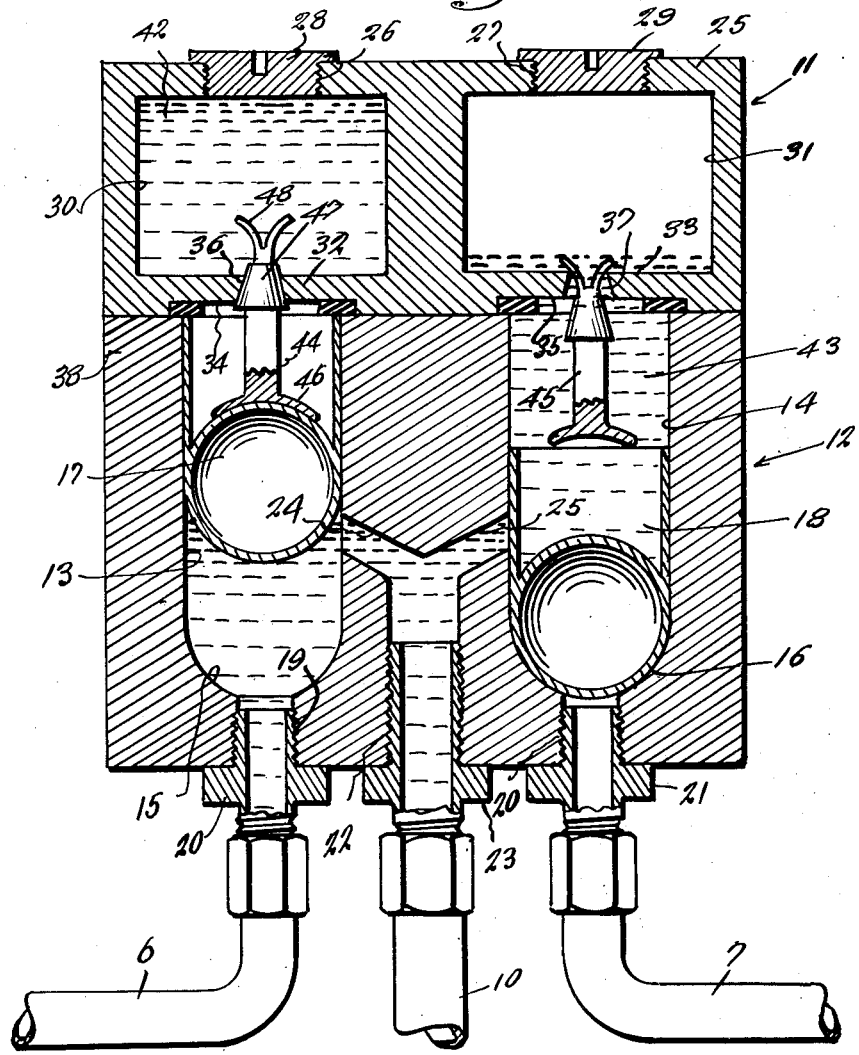

Patented Oct. 27, 1936

2,058,595

UNITED STATES PATENT OFFICE 2,058,595

GRAVITY SAFETY VALVE FOR HYDRAULIC BRAKE SYSTEMS

Frederick L. Klein, Hartford, Conn., assignor of one-half to Walter Schlotzhauer, Hartford, Conn.

Application August 8, 1936, Serial No. 95,025

3 Claims. (Cl. 303—84)

My invention relates generally to valve means for use in hydraulic brake systems for preventing escape of hydraulic fluid under pressure upon development of a leak in one or more portions of the system, so that the remaining operative elements of the system are retained in operative condition, and particularly to a gravity safety valve of this general character which can be incorporated in one or more places in the hydraulic brake system, and an important object of my invention is to provide a simple and effective arrangement of this character.

Another important object of my invention is to provide an arrangement of the character indicated above employing gravity and fluid operated floats, and containing reservoirs to contain sufficient fluid for insuring gravity operation of the valve and for replacement of fluid lost or discharged while the closing action of the valve is taking place.

Other important objects of my invention will be apparent from a reading of the following description taken in connection with the drawings, wherein for purposes of illustration I have shown a preferred embodiment of my invention.

In the drawings:—

Figure 1 is a top plan view of an automobile chassis illustrating a hydraulic brake system incorporating the device of the present invention.

Figure 2 is a bottom plan view of the gravity safety valve.

Figure 3 is a longitudinal vertical sectional view taken through the safety valve.

Figure 4 is a top plan view of one of the float valves.

Figure 5 is a side elevational view of one of the float valves showing a portion in section and taken approximately on the line 5—5 of Figure 4.

Figure 6 is a front end elevational view of the master cylinder of the brake system showing the device of the invention mounted thereon.

Referring in detail to the drawings, the numeral 5 generally designates an automobile chassis embodying a hydraulic brake system including the rear hydraulic brake feeding tube 6 and the front brake feeding tube 7 and the master cylinder 8 having the discharge nipple 9 connected to the tube 10 which leads into the valve of the present invention which is generally designated 11. The rear brake tube 6 is connected as indicated in Figure 2 to the valve 11, and the front brake feeding tube 7 is connected to the valve 11 on the opposite side of the pipe 10.

The valve 11 consists per se in the block 12 which has twin vertical bores 13 and 14 therein which open through the top of the block and have at their lower ends semicircular valve seat portions 15, 16, respectively, on which the respective float valves 17 and 18 are adapted to seat to close off fluid supply to the front brakes or ear brakes, as the case may be. Partially threaded bores 19 and 20 leading into the lower ends of the seats 15 and 16 have threaded thereinto the adapters 20 and 21 to which the tubes 6 and 7, respectively, are connected in a well known manner. A third and centralized partially threaded bore 22 opens through the bottom of the block like the bores 19 and 20 and has threaded therein an adapter 23 by means of which the master cylinder tube 10 is connected. The upper part of the bore 22 has lateral and upwardly and outwardly inclining passages 24 and 25 which open, respectively, into the sides of the chambers formed by the bores 13 and 14 at a point below the middle height thereof in the embodiment of the invention shown and described herein.

Suitably mounted on the top of the block 12 is the reservoir containing body 25 which has in the top thereof two filling openings 26 and 27 which are closed by filling plugs 28 and 29, respectively, and these filling openings lead into hydraulic fluid reservoirs 30 and 31 which have bottom walls 32 and 33 circularly reduced on their undersides as indicated by the numerals 34 and 35 and penetrated at their centers by beveled valve seats 36 and 37.

Confined in the recesses defined by the reductions 34 and 35 are annular gaskets 38 and 39 which project out over the side walls of the bores 13 and 14.

Vertically movable within each bore 13 and 14 is a respective float valve 17, 18 and these are similar in construction. Each float valve comprises a hollow aluminum ball portion 40 and an open top cylindrical portion 41 which is fastened peripherally to the top of the ball portion as clearly indicated in Figure 5. Preferable material for the formation of the float valves is aluminum. The float valves are of a suitable diameter to properly work in the bores and conform to the semi-circular seats 15 and 16 to close off the tubes 6 and/or 7 when in the depressed position in which the float valve 18 is shown.

In normal operation, both of the reservoirs 30 and 31 contain hydraulic fluid 42, 43 which is held therein by the respective valves 44 and 45. These valves are similarly constructed and comprise a stem having a spherical segmental foot 46 to rest on the top of the ball portion 40 of the respective float valve, the beveled portion 47 which coacts with the beveled seats 36 and 37 and the arms 48 which prevent the valves from falling through the openings 36 and 37.

In Figure 3 of the drawings is shown the disposition of the parts when a break has occurred in the front brakes to which the feed tube 7 leads. As soon as the leak has occurred in the brakes to which the tube 7 leads, the fluid below the float valve 18 passed through the pipe 7 from below the float valve 18, so that the float valve 18 was permitted to drop in the bore 14 away from the valve 45. During the dropping action the valve 45 was moved to the open position so that the fluid 43 in the reservoir 31 passed into the bore 14 above the float valve 18 and loaded into the cylindrical portion 41 of the float valve 18 above the ball portion and by its weight pushed the valve 18 positively down to seat on the seat 16 and thereby effectively closed off the tube 7 from the hydraulic pressure supply pipe 10 and from the bore 13. The reservoir 31 is of sufficient capacity to replace in the hydraulic system the fluid lost through the leak which took place before the float valve 18 came to seat, and sufficient in amount to positively weight down the float valve 18. It will be observed that the cylindrical portion of the float valve positively cuts off the passage 25 into the bore 14, so that the hydraulic system other than that fed by the tube 7 is preserved in normal operating condition.

Had the rear brakes fed by the tube 6 developed the leak instead of the front brakes fed by the tube 7, the float valve 17 would have acted in the manner described in conjunction with the float valve 18. Had both the front and rear brakes developed a leak, both float valves would have acted as described.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A safety device for use with a hydraulic brake system including a master cylinder and a front brake feeding tube and a rear brake feeding tube, said safety device comprising a body containing a first valve chamber having discharge connection to one of said tubes, a second valve chamber having discharge connection to the remaining tube, a passage common to said valve chambers and having intake connection with said master cylinder, a valve seat at the discharge end of each of said chambers, a float valve in each chamber above said seat and normally floating in an elevated open position above and in open relation to said passage and said seat, the lower part of said valve chambers and said tubes being normally filled with fluid floating said float valves in elevated open positions, said float valve being arranged to fall to closed position upon sufficient depletion of the fluid in said valve chamber and the corresponding tube upon development of a leak in the system fed by such tube.

2. A safety device for use with a hydraulic brake system including a master cylinder and a front brake feeding tube and a rear brake feeding tube, said safety device comprising a body containing a first valve chamber having discharge connection to one of said tubes, a second valve chamber having discharge connection to the remaining tube, a passage common to said valve chambers and having intake connection with said master cylinder, a valve seat at the discharge end of each of said chambers, a float valve in each chamber above said seat and normally floating in an elevated open position above and in open relation to said passage and said seat, the lower part of said valve chambers and said tubes being normally filled with fluid floating said float valves in elevated open positions, said float valve being arranged to fall to closed position upon sufficient depletion of the fluid in said valve chamber and the corresponding tube upon development of a leak in the system fed by such tube, an auxiliary fluid reservoir above each valve chamber, gravity valve means controlling communication between said auxiliary reservoirs and said valve chambers, said valve means comprising a valve normally assuming an open position, said valve having a portion engageable by the corresponding float valve only in the elevated open position of the float valve to hold said valve in elevated closed position, said valve being arranged to drop to open position upon the falling of the float valve toward closed position.

3. A safety device for use with a hydraulic brake system including a master cylinder and a front brake feeding tube and a rear brake feeding tube, said safety device comprising a body containing a first valve chamber having discharge connection to one of said tubes, a second valve chamber having discharge connection to the remaining tube, a passage common to said valve chambers and having intake connection with said master cylinder, a valve seat at the discharge end of each of said chambers, a float valve in each chamber above said seat and normally floating in an elevated open position above and in open relation to said passage and said seat, the lower part of said valve chambers and said tubes being normally filled with fluid floating said float valves in elevated open positions, said float valve being arranged to fall to closed position upon sufficient depletion of the fluid in said valve chamber and the corresponding tube upon development of a leak in the system fed by such tube, an auxiliary fluid reservoir above each valve chamber, gravity valve means controlling communication between said auxiliary reservoirs and said valve chambers, said valve means comprising a valve normally assuming an open position, said valve having a portion engageable by the corresponding float valve only in the elevated open position of the float valve to hold said valve in elevated closed position, said valve being arranged to drop to open position upon the falling of the float valve toward closed position, said float valves each comprising a hollow ball and a cup on top of said hollow ball, the fluid passage from the auxiliary reservoir being adapted to fall into said cup to positively move said float valve to fully closed position after initial opening movement of the float valve has permitted the gravity valve to open.

FREDERICK L. KLEIN.